United States Patent [19]
Rhodes et al.

[11] Patent Number: 6,164,374
[45] Date of Patent: Dec. 26, 2000

[54] THERMOSTAT HAVING A MULTIPLE COLOR SIGNAL CAPABILITY WITH SINGLE INDICATOR OPENING

[75] Inventors: William D. Rhodes, Red Bud, Ill.; Bartholomew L. Toth, St. Louis, Mo.

[73] Assignee: Emerson Electric Co., St. Louis, Mo.

[21] Appl. No.: 09/109,470

[22] Filed: Jul. 2, 1998

[51] Int. Cl.[7] .................................................. G05D 23/00
[52] U.S. Cl. ........................................... 165/240; 236/94
[58] Field of Search .............................. 165/240; 236/94; 62/127

[56] References Cited

U.S. PATENT DOCUMENTS

| | | |
|---|---|---|
| 4,702,225 | 10/1987 | Heffernan et al. . |
| 4,828,016 | 5/1989 | Brown et al. . |
| 5,125,572 | 6/1992 | Piegari . |
| 5,224,649 | 7/1993 | Brown et al. . |
| 5,316,073 | 5/1994 | Klaus et al. . |
| 5,374,876 | 12/1994 | Horibata et al. . |
| 5,482,209 | 1/1996 | Cochran et al. . |
| 5,570,837 | 11/1996 | Brown et al. . |

OTHER PUBLICATIONS

White–Rodgers, Operating Instructions, Comfort Set® III Digital Thermostats, undated, pp. 1–24.

*Primary Examiner*—Ira S. Lazarus
*Assistant Examiner*—Ljilijana V. Ciric
*Attorney, Agent, or Firm*—Bryan K. Wheelock

[57] ABSTRACT

A thermostat for operating a climate control system, the thermostat comprising a base, a bi-color LED on the base capable of producing at least two distinct illuminated signals, and a cover for the base, the cover having a single signal opening which is aligned with the bi-color LED when the cover is on the base to provide at least two distinct lighted signals in a thermostat through a single signal opening in the cover.

12 Claims, 4 Drawing Sheets

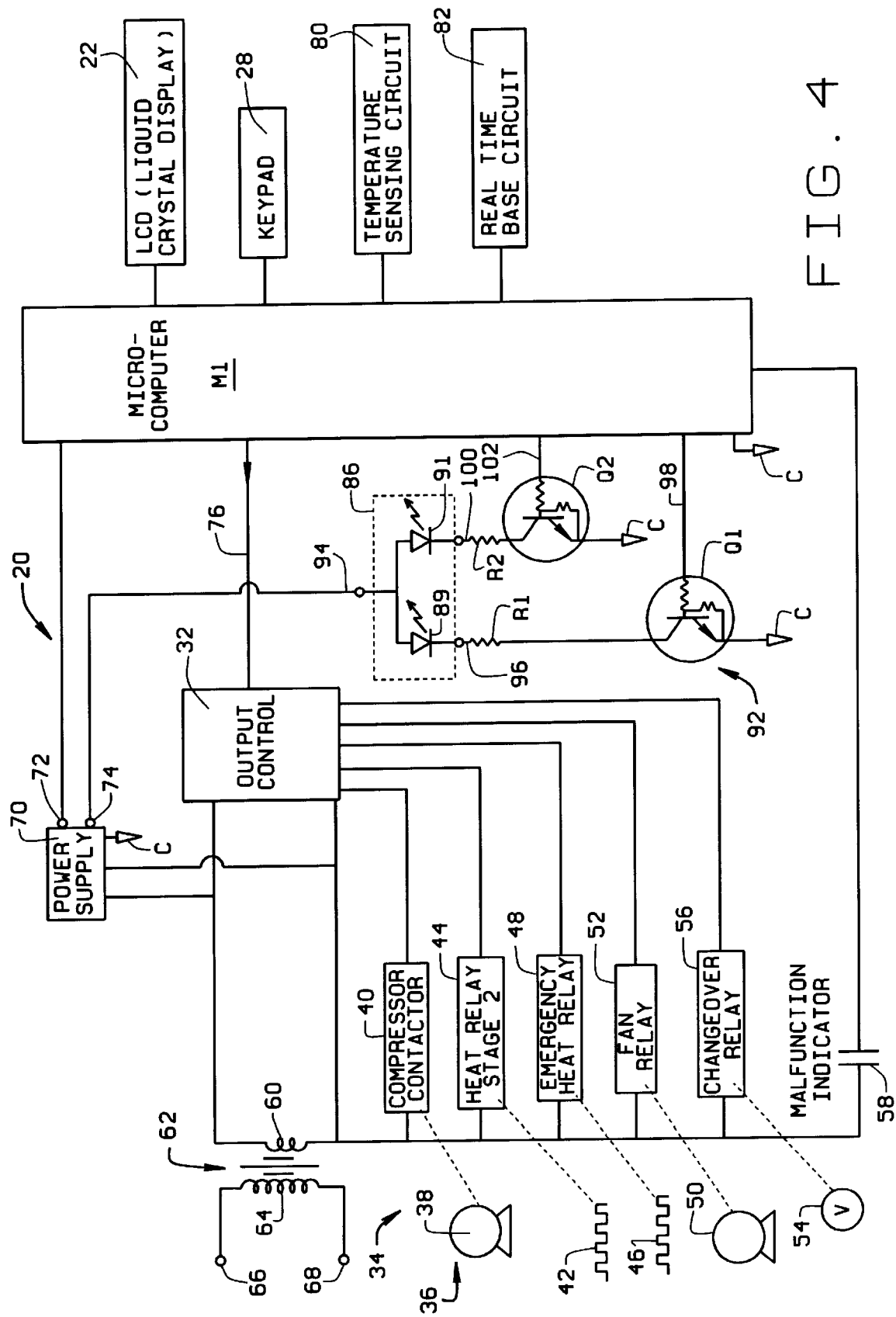

THERMOSTAT HAVING A MULTIPLE COLOR SIGNAL CAPABILITY WITH SINGLE INDICATOR OPENING

FIELD OF THE INVENTION

This invention relates to thermostats for operating climate control systems, and in particular to thermostats having indicator lights for indicating the status of the climate control systems they operate.

BACKGROUND OF THE INVENTION

Thermostats for operating climate control systems are often provided with one or more indicator lights for indicating the status of the climate control system. For example, indicator lights are provided on some thermostats to indicate that the air conditioning is operating or that the furnace is operating. The appropriate number of indicator lights depends upon the size and type of climate control system (e.g. single stage, multi-stage, or heat pump) that is operated by the thermostat. From a user standpoint, it is confusing to have indicator lights that do not function or do not relate to the particular user's climate control system. From a manufacturing standpoint, it is expensive to manufacture a plurality of different thermostat housings to accommodate different thermostats with different numbers of indicator lights. Each different housing configuration requires a different mold, and increases the number of parts that must be maintained in inventory.

SUMMARY OF THE INVENTION

The thermostat of the present invention is adapted for operating a climate control system, and providing illuminated signals of at least two different colors for indicating the status of the climate control system. Generally, the thermostat comprises a base and a bi-color LED on the base capable of producing illuminated signals of at least two different colors. The thermostat further includes a cover for the base, the cover having a single opening for an indicator light which opening is aligned with the bi-color LED when the cover is on the base. The bi-color LED is preferably of the type comprising two LED's, and is capable of producing at least three distinct illuminated signals, an illuminated signal of a first color when one of the LED's is energized, an illuminated signal of a second color when the other of the LED's is energized, and an illuminated signal of a third color when both of the LED's are energized.

The thermostat includes a circuit connectable to the climate control system for operating the bi-color LED to produce a first illuminated signal upon the occurrence of a first condition, and a second illuminated signal upon the occurrence of a second condition. In the preferred embodiment, the bi-color LED is of the type in which when one of the LED's is energized, the bi-color LED provides a green signal light, when the other of the LED's is energized, the bi-color LED provides a red signal light, and when both of the LED's are energized, the bi-color LED provides a yellow signal light, and thus the bi-color can distinctly indicate at least three conditions of the climate control system. For example, in a conventional heat pump system when the compressor of the heat pump is operating, the circuit can energize the bi-color LED to provide a green indicator light; when the emergency heater is operating, the circuit can energize the bi-color LED to provide a red indicator light; and when the supplemental heater is operating, the circuit can energize the bi-color LED to provide a yellow indicator light.

With the thermostat of this invention, a single cover can be made with a single indicator opening for accommodating a single bi-color LED, yet the thermostat can function like a thermostat with one, two, or three indicator lights. Thus, the cost of manufacture is reduced, and inventorying parts is simplified. These and other features and advantages will be in part apparent and in part pointed out hereinafter.

BRIEF DESCRIPTION OF THE DRAWINGS

FIG. 4 is a schematic view of the thermostat and an example climate control system;

Corresponding reference numerals indicate corresponding parts throughout the several views of the drawings.

DETAILED DESCRIPTION OF THE PREFERRED EMBODIMENT

Figure 1:
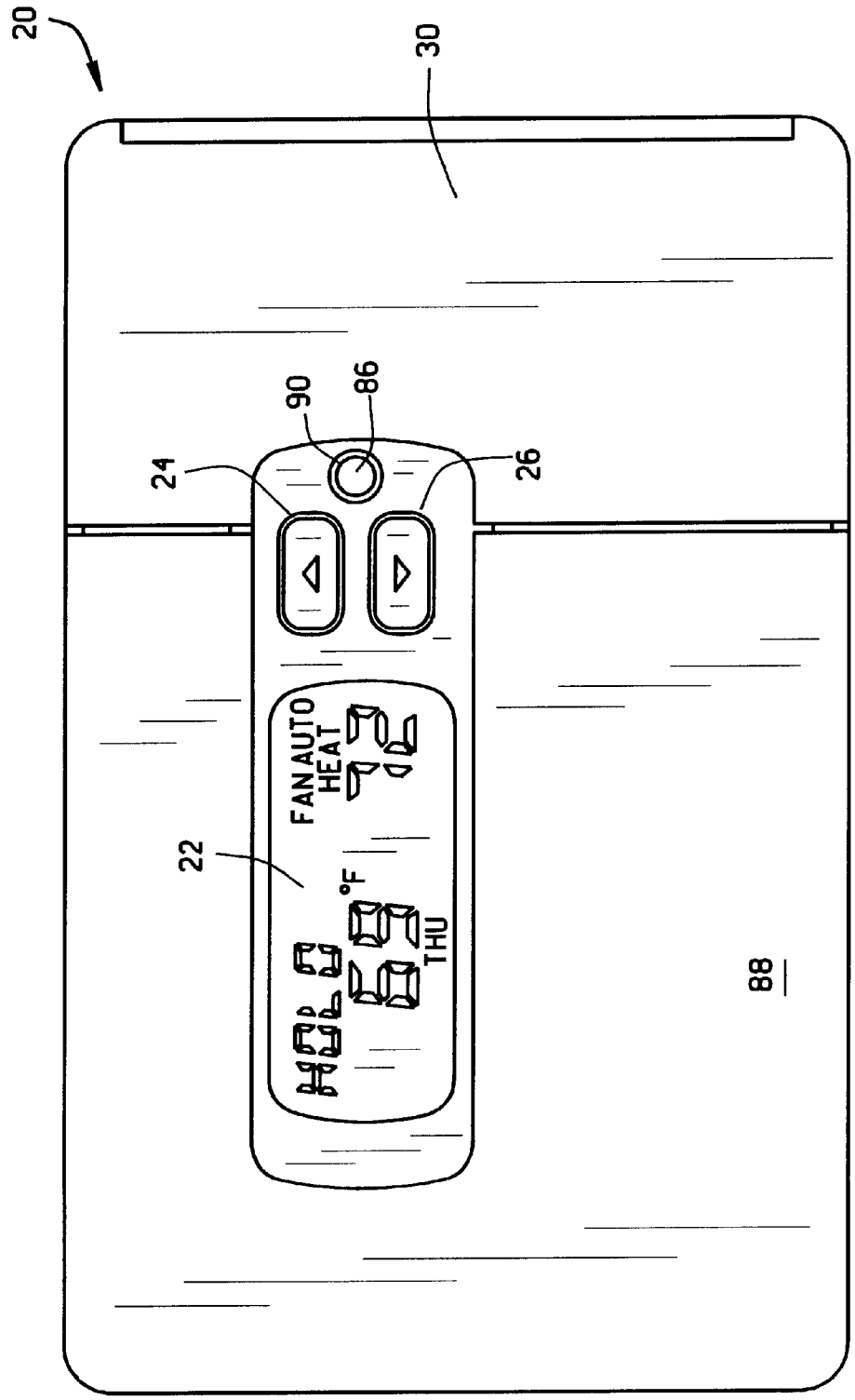
FIG. 1 is a front elevation view of a first embodiment of a thermostat constructed according to the principles of this invention.
Figure 2:
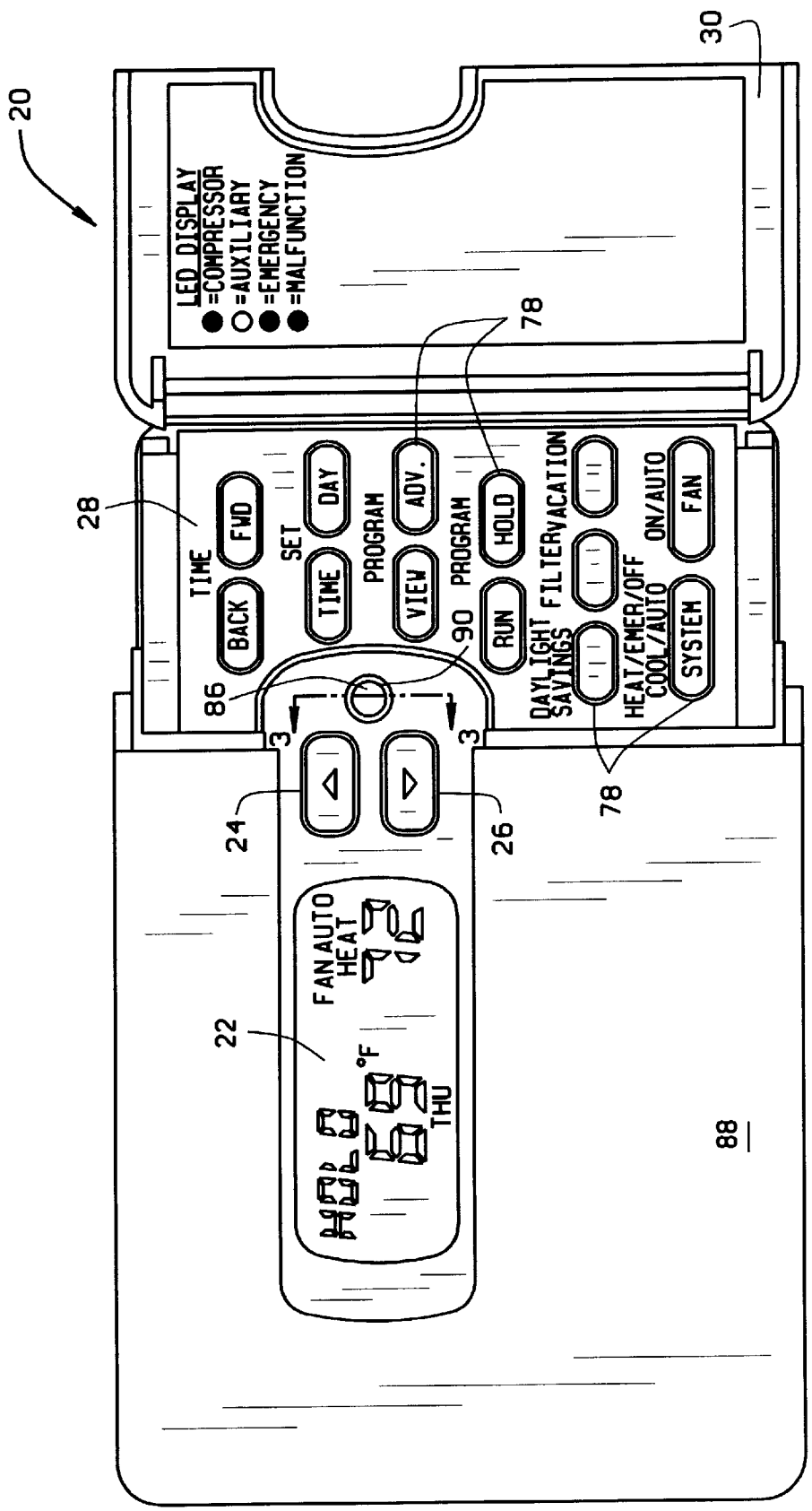
FIG. 2 is a front elevation view of the thermostat, with the hinged cover open.

A thermostat for operating a climate control system and constructed according to the principles of this invention is indicated generally as 20 in FIGS. 1 and 2. As shown in FIGS. 1 and 2 the thermostat is preferably a modern digital, programmable thermostat, such as disclosed in U.S. Pat. Nos. 4,828,016, 5,224,649, and 5,570,837, incorporated herein by reference. However this invention is not limited to any particular type of thermostat.

The thermostat 20 has a digital LCD display 22 which displays the time of day, the set temperature and the actual temperature. The LCD display 22 may also display additional information, for example indicating the mode of current operation, the day of the week, and the programmed fan operation. The thermostat 20 also has control buttons 24 and 26 for raising and lowering the set temperature. The thermostat 20 preferably also has a keypad 28, protected by a hinged cover 30, for programming the thermostat.

As shown schematically in FIG. 4, the thermostat 20 is adapted, through its output control 32, to operate the climate control system 34. The climate control system 34 can take many forms, a typical one of which comprises a heat pump system 36, which includes a compressor 38, a contractor 40 for controlling the compressor, an auxiliary heater 42, a relay 44 for operating the auxiliary heater, an emergency heater 46, a relay 48 for operating the emergency heater, a circulator fan 50, a relay 52 for operating the circulator fan, a changeover valve 54, a relay 56 for operating the changeover valve, and a malfunction indicator 58. Of course, the thermostat 20 of the present invention can be used with climate control systems with other configurations.

The output control 32 is connected to the secondary winding 60 of a voltage step-down transformer 62. The primary winding 64 of the transformer 62 is connected across terminals 66 and 68 of a conventional 120 volt alternating current power source. A power supply 70 is also connected across the secondary winding 60 of the transformer and provides a 5 volt DC current output at terminal 72 and a 24 volt DC output at terminal 74.

The thermostat 20 includes a microcomputer M1 which is connected by connector 76 to the output control 32. The connector 76 typically comprises a plurality of electric leads connected to the output pins of the microcomputer M1 to provide output signals for controlling operation of the output control 32 in accordance with the programming of the microcomputer. Microcomputer M1 is connected to the 5-volt output terminal 72 of the power supply 70.

The keypad 28, which has a plurality of keys or buttons 78, is connected to the microcomputer M1 to enable a user to program the microcomputer, for example to establish a time-temperature schedule for the operation of the thermostat 20. The LCD display 22 is also connected to the microcomputer M1.

The thermostat includes a temperature sensing circuit 80, having a thermistor (not shown) in circuit with an oscillator (not shown) the output frequency of which is measured by microcomputer M1, and converted to a measurement of degrees of temperature. The thermostat also includes a real time base circuit 82, having a crystal oscillator (not shown), which provides an accurate time base for all real time functions.

Figure 3:
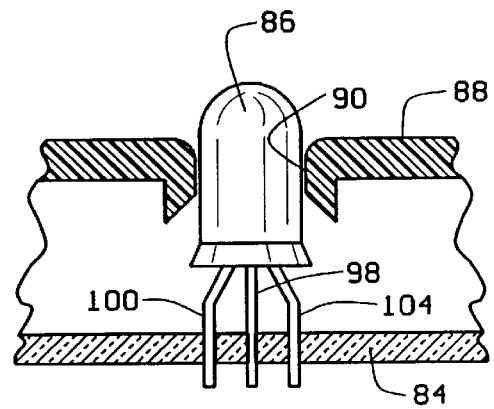
FIG. 3 is a partial cross-sectional view of the thermostat, taken along the plane of line 3—3 in FIG. 2, showing the mounting of the bi-color LED.

As shown in FIG. 3, the thermostat 20 comprises a base 84 having a bi-color LED 86 mounted thereon. A cover 88 (shown in FIGS. 1 and 2) is adapted to be mounted over the base 84. The cover 88 is preferably made of molded plastic, and has a single indicator opening 90 therein, which aligns with the bi-color LED 86 when the cover is mounted over the base 84. The bi-color LED 86 is capable of producing at least two, and preferably three, illuminated signals of different colors. The bi-color LED 86 preferably comprises two LED's 92 and 94 that produce an illuminated signal of a first color when one of the LED's is energized, an illuminated signal of a second color when the other of the LED's is energized, and preferably an illuminated signal of a third color when both of the LED's are energized. A suitable bi-color LED is Ledtech LT2462-25-D51 available from Dy-Tronix Inc., Bridgeton, Mo. This bi-color LED is capable of producing a green illuminated signal, a red illuminated signal, and a yellow illuminated signal.

The thermostat 20 also includes a circuit 96 that is connected to the climate control system 34 to energize one of the LED's in the bi-color LED 86 upon the occurrence of a first condition in the climate control system, energizing the other of the LED's in the bi-color LED upon the occurrence of a second condition in the climate control system, and energizing both of the LED's upon the occurrence of a third condition in the climate control system. For example, in the preferred embodiment where the bi-color LED is of the type that produces a green light when one of the LED's is energized, a red light when the other of the LED's is energized, and a yellow light when both of the LED's are energized, and the thermostat is used to operate the climate control system 34, the circuit 96 energizes the bi-color LED 86 to produce a green light when the compressor is operating; to produce a yellow light when auxiliary heating is operating; and to produce red light when emergency heating is operating.

More specifically, as shown in FIG. 4, the lead 98 of bi-color LED 86 is connected to the 24 volt output terminal 74 of the power supply 70. The lead 100 of bi-color LED 86 is connected through resistor R1 to the collector of transistor Q1. The emitter of transistor Q1 is connected to common C and the base of transistor Q1 is connected by lead 106 to an output pin of microcomputer M1. The lead 102 of bi-color LED 86 is connected through resistor R2 to the collector of transistor Q2. The emitter of transistor Q2 is connected to common C and the base of transistor Q2 is connected by lead 106 to an output pin of microcomputer M1. Microcomputer M1 provides enabling outputs on leads 102 and 106 to control conduction of transistors Q1 and Q2, respectively. When transistor Q1 is energized, LED 92 in bi-color LED 86 is energized and glows red. When transistor Q2 is energized, LED 94 in bi-color LED 86 glows green. When both transistors Q1 and Q2 are energized, both LED's 92 and 94 are energized, and the resulting glow from the bi-color LED 86 is yellow.

When the microcomputer M1 outputs a signal to effect energizing of the compressor 38, it outputs a signal to turn on transistor Q2, thereby energizing LED 94 of bi-color LED 86, causing the bi-color LED to glow green. When auxiliary (stage 2) heating is required, microcomputer M1 outputs a signal to energize the auxiliary heater 42, and outputs a signal to turn on both transistors Q1 and Q2, thereby energizing LED's 92 and 94 of bi-color LED 86, causing the bi-color LED to glow yellow. When emergency heating is required, microcomputer M1 outputs a signal to effect energizing of emergency heater 46, and outputs a signal to turn on transistor Q1, thereby energizing LED 92 of the bi-color LED 86, causing the bi-color LED to glow red.

In the event of a malfunction in the climate control system, the contacts of the malfunction indicator 58 will close, providing a signal to microcomputer M1. Microcomputer M1 outputs a signal to operate transistor Q1 at a frequency of 1 Hz thereby energizing LED 92 of bi-color LED 86 at a frequency of 1 Hz, causing the bicolor LED to flash red at a frequency of 1 Hz.

Figure 5:
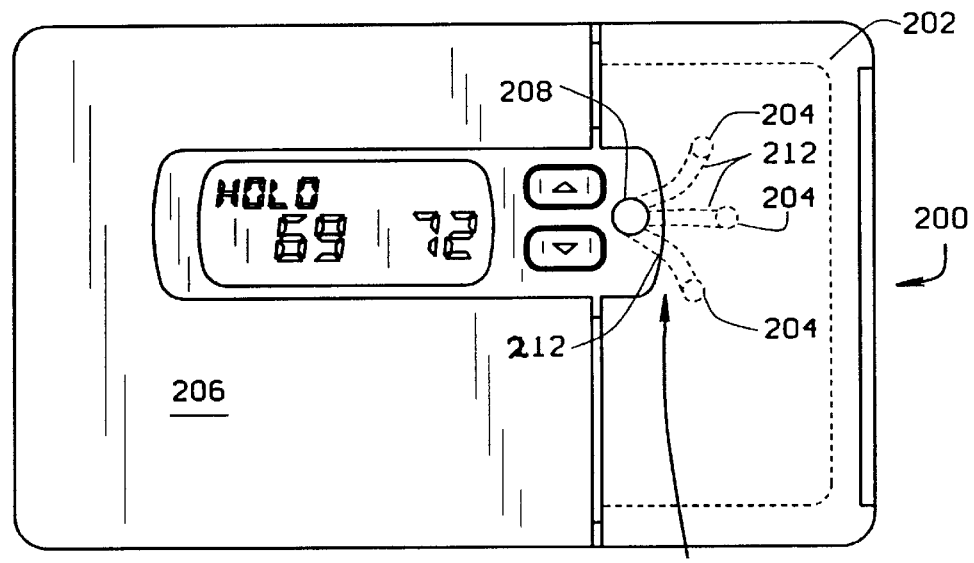
FIG. 5 is a partial cross-sectional view of a second embodiment of a thermostat constructed according to the principles of this invention.

A second embodiment of a thermostat constructed according to the principles of this invention is indicated generally as 200 in FIG. 5. The thermostat 200 comprises a base 202 having a plurality of different colored LED's 204 thereon. The thermostat 200 also comprises a cover 206, adapted to be mounted over the base 202. The cover 206 is preferably made of molded plastic, and has a single indicator opening 208 therein. A light guide 210 such as a bundle of optical fibers 212 extending between each LED and the indicator opening 208, transmits the light signal from each LED to the single indicator opening. The cover 206 can thus be used with a thermostat having any number of LED's with the single signal opening displaying the LED signal light transmitted by the optical fibers from the LED's 204.

Figure 6:
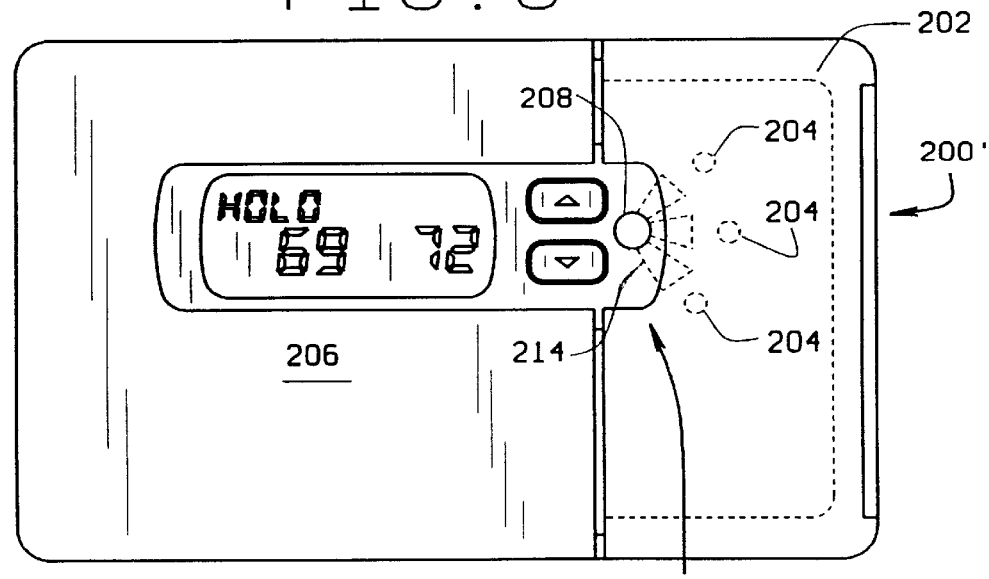
FIG. 6 is partial cross-sectional view of an alternate construction of the second embodiment.

An alternate construction of the second embodiment of a thermostat constructed according to the principles of this invention is indicated generally as 200' in FIG. 6. Thermostat 200' is similar in construction to thermostat 200, and corresponding parts are identified with corresponding reference numerals. However in thermostat 200', instead of optical fibers 112, the light guide 210 is a faceted lens 214 that transmits light from the LED's 204 to the single indicator opening 208.

OPERATION

In operation, the thermostat 20 of the first embodiment is connected to a climate control system, such as climate control system 34. The climate control system can include a furnace or other heater, and/or an air conditioner and/or a heat pump. The cover 88 of the thermostat 20 has just a single opening 90 for accommodating a single bi-color LED 86. This same cover can be used on a wide variety of thermostats with the capability of providing one, two, three, or perhaps more light signals of different colors. Through the use of a bi-color LED 86, the user sees a single indicator and is not confused by "extra" indicators that do not apply to the user's system. The same basic thermostat 20 can be used in climate control systems requiring one or more indicator lamps, reducing manufacturing and inventory costs.

When the compressor 38 of the heat pump 36 in system 34 is operating the bi-color LED 86 is green; when the auxiliary heater 42 in system 34 is operating, the bi-color LED is yellow; and when the emergency heater 46 in system 34 is operating, the bi-color LED is red. The bi-color LED 86 can flash to increase the number of conditions the single LED can signal, for example flashing red when malfunction indicator 58 identifies a malfunction in the system 34.

In operation, thermostat 200 or 200' of the second embodiment is connected to a climate control system. The cover 206 of the thermostat 200 or 200' has a single opening 208 through which the single light from one of the LED's 204 can be viewed via the optical fibers 212 in thermostat 200 or via the faceted lens 214 in thermostat 200'.

What is claimed is:

1. A thermostat for operating a climate control system, the thermostat comprising at least one LED capable of producing at least two differently colored signals indicative of the status of the climate control system, a cover enclosing at least one LED and having a single viewing opening enabling at least two differently colored signals to be viewed through the single viewing opening in the cover.

2. The thermostat according to claim 1 wherein the at least one LED comprises a bi-color LED.

3. The thermostat according to claim 1 wherein the at least one LED comprises at least two LED's.

4. A thermostat for operating a climate control system, the thermostat comprising a base, a light source on the base for providing at least two differently colored signal lights indicative of the status of the climate control system; a cover having a single indicator opening; and a light guide for transmitting the light from the light source to the indicator opening in the cover.

5. The thermostat according to claim 4 wherein the light source comprises a bi-color LED.

6. A thermostat for operating a climate control system, the thermostat comprising a base, a bi-color LED on the base capable of producing at least two distinctly colored illuminated signals, and a cover for the base, the cover having a single signal opening which is aligned with the bi-color LED when the cover is on the base.

7. A thermostat for operating a climate control system and producing at least two distinctly colored illuminated signals indicating non-coincident operating conditions of the climate control system, the thermostat comprising a base, a bi-color LED on the base capable of producing at least two distinctly colored illuminated signals, a circuit connectable to the climate control system for operating a bi-color LED to produce a first illuminated signal of a first color upon the occurrence of a first condition, and a second illuminated signal of a second color upon the occurrence of a second condition; and a cover for the base, the cover having a single signal opening which is aligned with the bi-color LED when the cover is on the base.

8. The thermostat according to claim 7 wherein the bi-color LED comprises two LED's, and is capable of producing at least three distinctly colored illuminated signals, a first signal when one of the LED's is energized, a second signal when the other of the LED's is energized, and a third signal when both of the LED's are energized.

9. The thermostat according to claim 8 wherein the thermostat produces at least three distinctly colored illuminated signals, the circuit energizing one of the LED's upon the occurrence of a first condition in the climate control system, energizing the other of the LED's upon the occurrence of a second condition in the climate control system, and energizing both of the LED's upon the occurrence of a third condition in the climate control system.

10. The thermostat according to claim 9 wherein the bi-color LED produces a green light when one of the LED's is lit, a red light when the other of the LED's is lit, and a yellow light when both of the LED's are lit.

11. The thermostat according to claim 10 wherein the climate control system comprises a heat pump including a compressor, an auxiliary heater, and an emergency heater and wherein the circuit drives the bi-color LED to produce a green light when the compressor is operating; to produce a yellow light when the auxiliary heater is operating; and to produce red light when the emergency heater is operating.

12. The thermostat according to claim 11 wherein the circuit drives the bi-color LED to produce a blinking red light in the event of a climate control system malfunction.

\* \* \* \* \*